H. C. LOWRANCE.
ANIMAL TRAP.
APPLICATION FILED APR. 13, 1914.
1,170,649.
Patented Feb. 8, 1916.
2 SHEETS—SHEET 1.
Fig. I
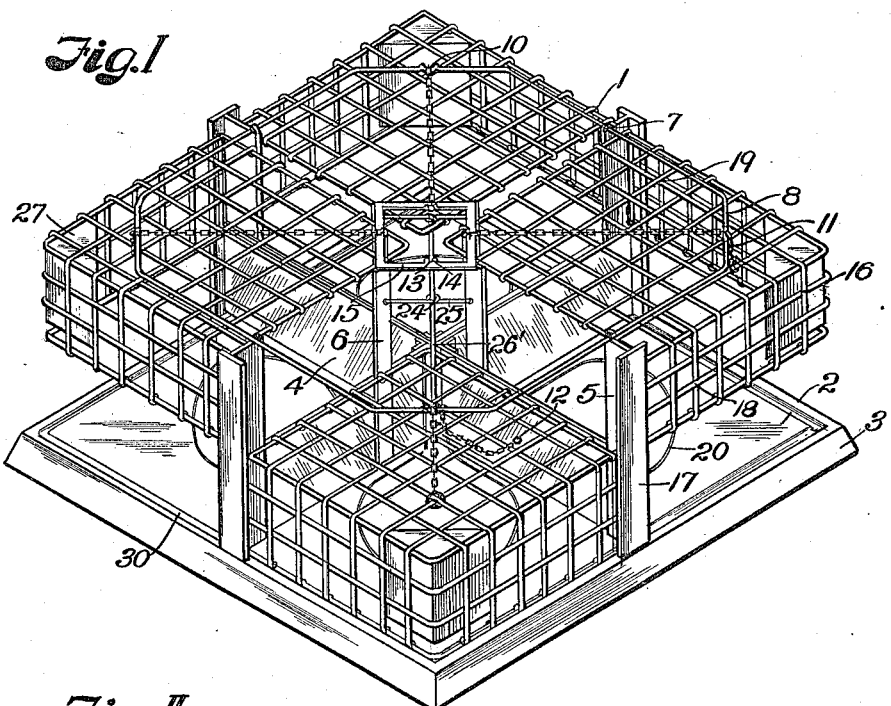
Fig. II
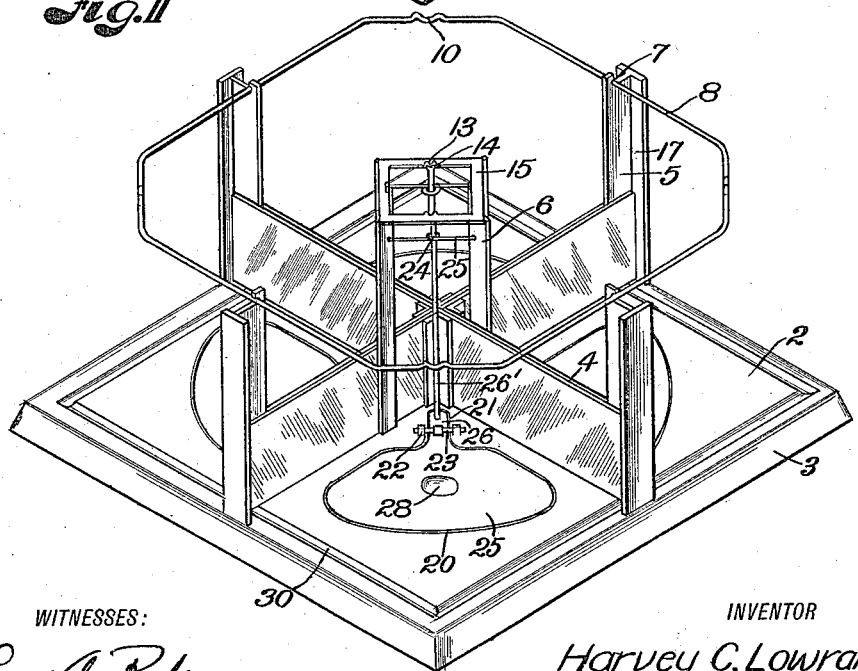
WITNESSES:
Lynn A. Robinson.
Arthur W. Caps.
INVENTOR
Harvey C. Lowrance.
BY
ATTORNEY H. C. LOWRANCE.
ANIMAL TRAP.
APPLICATION FILED APR. 13, 1914.
1,170,649.
Patented Feb. 8, 1916.
2 SHEETS—SHEET 2.
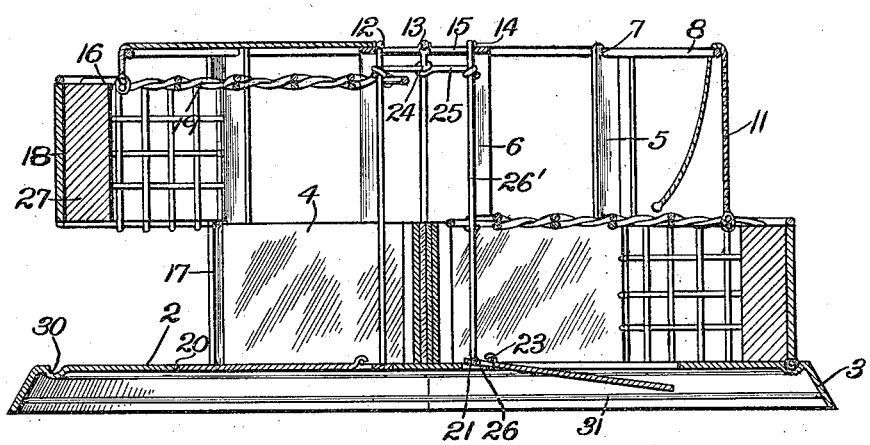
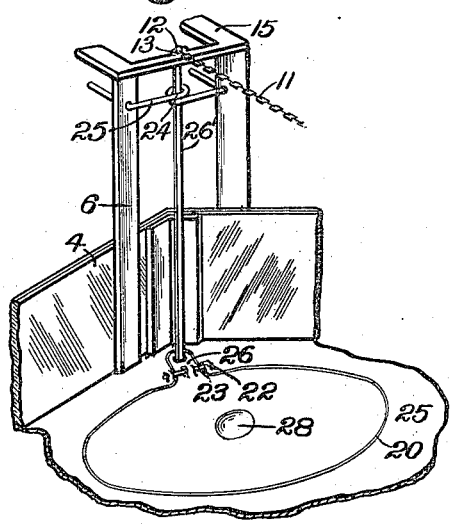
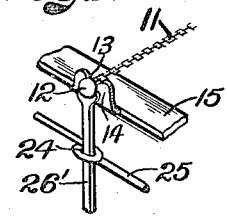
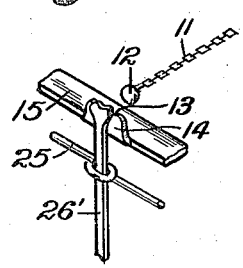
WITNESSES:
Lynn A. Robinson.
Arthur W. Capps.
INVENTOR
Harvey C. Lowrance.
BY
ATTORNEY

UNITED STATES PATENT OFFICE.

HARVEY C. LOWRANCE, OF KANSAS CITY, MISSOURI.

ANIMAL-TRAP.

1,170,649.

Specification of Letters Patent.

Patented Feb. 8, 1916.

Application filed April 13, 1914. Serial No. 831,628.

*To all whom it may concern:*

Be it known that I, HARVEY C. LOWRANCE, a citizen of the United States, residing at Kansas City, in the county of Jackson and State of Missouri, have invented certain new and useful Improvements in Animal-Traps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to animal traps, and has for its principal object to provide a device of this character comprising mirrors for attracting animals to the trapped cages, and tripping mechanism operable by the animals to be trapped for releasing the cages. In accomplishing this object I have provided the improved details of structure hereinafter described and illustrated in the accompanying drawings, wherein:—

Figure I is a perspective view of a trap constructed in accordance with my invention. Fig. II is a similar view with the cages removed and better illustrating the mirrors. Fig. III is a diagonal vertical section of the device. Fig. IV is a perspective view of a portion of one of the compartments, showing the tripping mechanism. Fig. V is a detail view, showing the relative position of the tripping rod and notch, before the trip is sprung. Fig. VI is a similar view, after the trip is sprung.

Referring more in detail to the drawings: 1 designates a trap constructed in accordance with my invention, comprising a metallic base member 2, having down-turned outer edges 3 upon which the base is supported above the floor. Rising vertically from the base 2, and extending radially from a central position are partitions 4 which serve to divide the trap into separate compartments and have mirrored faces for attracting animals into the trap; the said partitions being held in place by standards 5, which are mounted at the edges of the base and by an axial standard 6.

Supported on the upper ends of standards 5, and secured in notches 7 thereon, is a wire frame 8, which follows the contour of the base 2, except that its corners are diagonal and provided with upwardly opening guide sockets 10. Rising through the socket 10 at each corner of the frame wire 8, is a flexible cord or small chain 11, which is provided at its inner end with a ball 12, that is adapted for seating within a notch 13 in an upturned flange 14 on a band 15 that is supported upon standards 6 which rise from the center of the base 1. Suspended from the outer end of the cord 11 is a cage-like member 16, of wire mesh, which is adapted for vertical travel within the guides 17 on standards 5, and comprises vertical side members 18 and covering 19.

In the base 2 in each compartment of the trap, is a recess 20, having an inwardly directed notch 21, and rising from opposite sides of the notch are bearings 22 for carrying a pin 23, and mounted in the recess 20 is a trip plate 25, having an arm 26 projected into the recess neck and pivotally mounted on the pin 23, resting on the outer end of said arms is a vertically disposed releasing pin 26′, which extends through a guide loop 24 formed in a wire 25 which is mounted on and extends between standards 6, the upper end of the rod lying adjacent the flange 14 and directly below the notch 13 therein, so that when moved vertically it may engage the trip knob on the relative cage wire.

To set the trap, each cage member is raised and held suspended by seating the ball 12 that is attached to the end of its chain 11 within its relative notch 13; the tension of the chain being sufficient to overcome the pressure of the releasing pin 26′ due to the weight of the trip plate, and thereby holding the trip in normal position, or level with the base.

With the trap set as described, an animal approaching from any angle, sees its image in the reflectors and is lured onto the base 2 and trip plate 25. When the animal steps on the trip plate, the body of the plate is depressed, raising the arm 26 and pin 26′, so that the latter engages and unseats the delicately poised ball 12 from the notch 13, and the cage drops to trap the animal. To make the fall of the cage more certain, I place a weight 27 at the outer corner of each cage. This weight not only insures a quick fall but also serves as a balance for the cage, when it is suspended. I also prefer to provide each trip plate with a depressed bait cup 28, where suitable bait may be placed, and provide the outer edge of the base 2 with a depressed groove 30, in which the side members 18 of the cages may seat after falling, to hold the lower edges of the cages and obviate escape of a trapped animal. I also prefer to locate wires 31 beneath the base to support the trip plates 25 when the device is being lifted or carried about.

It will be seen that with this construction, an animal may be attracted within either by bait or by the reflectors, and when once within the trap, itself trips the cage, by which it is tripped. It is also apparent that as many individual compartments may be provided as may be desired or convenient, and that the numbers may be arranged to provide the most satisfactory results.

Having thus described my invention, what I claim as new therein, and desire to secure by Letters-Patent, is:—

In an animal trapping device, the combination of a base having a groove around the outer edge of its surface, a group of standards rising from the central portion of said base, each standard being one member of two pairs of standards, a frame imposed on the standard and having bar members for each pair, a notch in the center of each bar, with a plurality of end standards erected along the outer edge of the base, mirrors mounted between the central and end standards, a wire frame mounted on the end standards and having guide sockets, trip plates in the base, trip bars adapted to be actuated by said plates, wires on the central pairs of standards having guide loops for the trip bars, cages slidably mounted in the end and central standards, chains connected with the tops of said cages, and balls on the free ends of said chains, said balls being adapted for disengageable seating in the notches in said central standard bars.

In testimony whereof I affix my signature in presence of two witnesses.

HARVEY C. LOWRANCE.

Witnesses:
Lynn A. Robinson,
L. E. Coats.

Copies of this patent may be obtained for five cents each, by addressing the "Commissioner of Patents, Washington, D. C."